(12) United States Patent
Martin et al.

(10) Patent No.: US 7,431,390 B2
(45) Date of Patent: Oct. 7, 2008

(54) CYCLE SADDLE ASSEMBLY

(75) Inventors: Peter Gordon Martin, 22 Longfurlong Lane, Tetbury, Glos. GL8 8TJ (GB); David Benjamin Warner, 3 Victoria Cottages, Burleigh, Stroud, Glos. GL5 2PN (GB)

(73) Assignees: Tsai-Yun Yu, Taichung Hsien (TW); Peter Gordon Martin, Tetbury (GB); David Benjamin Warner, Burleigh (GB)

( * ) Notice: Subject to any disclaimer, the term of this patent is extended or adjusted under 35 U.S.C. 154(b) by 0 days.

(21) Appl. No.: 10/883,777

(22) Filed: Jul. 6, 2004

(65) Prior Publication Data

US 2005/0029842 A1 Feb. 10, 2005

(51) Int. Cl.
*B62J 1/02* (2006.01)
(52) U.S. Cl. ...................................................... 297/199
(58) Field of Classification Search ................. 297/199, 297/200, 195.1, DIG. 10; 248/654
See application file for complete search history.

(56) References Cited

U.S. PATENT DOCUMENTS

| 477,122 | A | * | 6/1892 | Johnson | 297/200 |
|---|---|---|---|---|---|
| 477,123 | A | * | 6/1892 | Johnson | 297/199 |
| 503,236 | A | * | 8/1893 | Guthrie et al. | 297/199 |
| 514,748 | A | * | 2/1894 | Decker | 297/199 |
| 566,344 | A | * | 8/1896 | Sager | 297/200 |
| 3,558,187 | A | * | 1/1971 | Morse | 297/199 |
| 5,775,710 | A | * | 7/1998 | Yu | 280/283 |
| 6,860,551 | B1 | * | 3/2005 | Chi | 297/200 |

FOREIGN PATENT DOCUMENTS

| BE | 887.812 | | 7/1981 |
|---|---|---|---|
| DE | 3420862 | A1 * | 12/1985 |
| DE | 297 18 546 | U1 | 1/1998 |
| DE | 197 02 188 | A1 | 7/1998 |
| DE | 298 06 399 | U1 | 7/1998 |
| FR | 1.469.068 | A | 4/1967 |
| GB | 1 312 326 | | 4/1973 |
| WO | WO-95/15274 | A1 * | 6/1995 |
| WO | WO-97/30885 | A1 | 8/1997 |

* cited by examiner

*Primary Examiner*—Joseph F Edell
(74) *Attorney, Agent, or Firm*—Birch, Stewart, Kolasch & Birch, LLP (57) ABSTRACT

A cycle saddle assembly includes a stem unit having a saddle stem. A pneumatic suspension member is supported by the stem unit. A saddle seat is supported at least in part by the pneumatic suspension member for movement relative to the saddle stem. Whereby the shock omnidirectionally transmitting from the rider and the frame of the bicycle during riding will be absorbed by such a cycle saddle assembly.

3 Claims, 9 Drawing Sheets

CYCLE SADDLE ASSEMBLY

This Non-provisional application claims priority under 35 U.S.C. § 119(a) on Pat. application No(s). 0316041.3 filed in Great Britain on Jul. 9, 2003, the entire contents of which are hereby incorporated by reference.

BACKGROUND OF THE INVENTION

1. Field of the Invention

The present invention relates generally to cycle saddles and, more particularly to a cycle saddle assembly with a pneumatic suspension means, which can absorb shock omnidirectionally transmitting from the saddle and cycle body during riding.

2. Description of the Related Art

Shock herein said is a transfer of high amplitude energy to a person, which can cause serious trauma—tissues or bones may be fractured or crushed instantly upon impact with a hard surface. Shock is likely to occur, for example, when one rides a bicycle over a rough surface, such as an unpaved road, an abrupt displacement of the vehicle is transmitted directly through the rigid frame, seat, and control surfaces to the rider.

In order to absorb shock, sprung saddles have been developed, which include a pair coir-spring suspension means arranged respectively on the underside of the saddle to attenuate the shock load. However, such arranged coil-spring suspension means can only absorb shock produced from specific direction. In other words, such arranged coil-spring suspension means can not absorb shock produced from any direction. In addition, for being too heavy, sprung saddles are only suitable for regular bicycles, not practical for racing bicycles or mountain bikes.

Accordingly, what is needed is a cycle saddle assembly that is lightweight and capable of absorbing shock omnidirectionally and distributing pressure evenly.

SUMMARY OF THE INVENTION

According to a first aspect of the present invention, there is provided a cycle saddle assembly comprising a stem unit having a saddle stem, a pneumatic suspension member supported by the stem unit, and a saddle seat supported at least in part by the pneumatic suspension member for movement relative to the saddle stem.

According to a second aspect of the invention, there is provided a saddle assembly comprising a saddle body having a narrow end and a wide end, a support frame disposed at a bottom of said saddle body and coupled to a cycle saddle support unit; and a pneumatic suspension means arranged between the bottom of said wide end of said saddle body and said support frame in such a way that said saddle body has a movement relative to said support frame.

According to a third aspect of the invention, there is provided a cycle saddle assembly comprising a support frame having a front end and a rear end, and coupled to a cycle saddle support unit; a first support plate connected to said rear end of said support frame; a saddle body having a wide end and a narrow end, the bottom of said narrow end being connected to said front end of said support frame; a second support plate connected to the bottom of said wide end of said saddle body; and at least a pneumatic member placed in between said first support plate and said second support plate.

According to a fourth aspect of the invention, there is provided a cycle saddle assembly comprising a saddle body having a wide end and a narrow end; a support frame having a front end and a rear end, and coupled to a cycle saddle support unit; a first pneumatic suspension means disposed between said the bottom of wide end of said saddle body and said rear end of said support frame in such a way that said saddle body has a movement relative to said support frame; and a second pneumatic suspension means disposed between said the bottom of narrow end of said saddle body and said front end of said support frame in such a way that said saddle body has a movement relative to said support frame.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and, the accompanying drawings, which are given by way of illustration only, and thus are not limitative of the present invention, and in which.

DETAILED DESCRIPTION OF THE INVENTION

Firstly, referring to FIGS. 1-4, there is shown a cycle saddle assembly which comprises a stem unit 10, a pneumatic suspension member 12, and a saddle seat 14. The stem unit 10 includes a saddle post or stem (hereinafter simply referred to as a 'saddle stem 16') with a traditional-type releasable saddle clamp 18 at its upper end, a pair of elongate saddle support elements 10, typically in the form of resiliently flexible metal or plastics rods, clamped by the saddle clamp 18, a support plate 22 connected to first ends 10a of the elongate support elements 20, and a locating strut element 24 coupled with the support plate 22.

Figure 1:
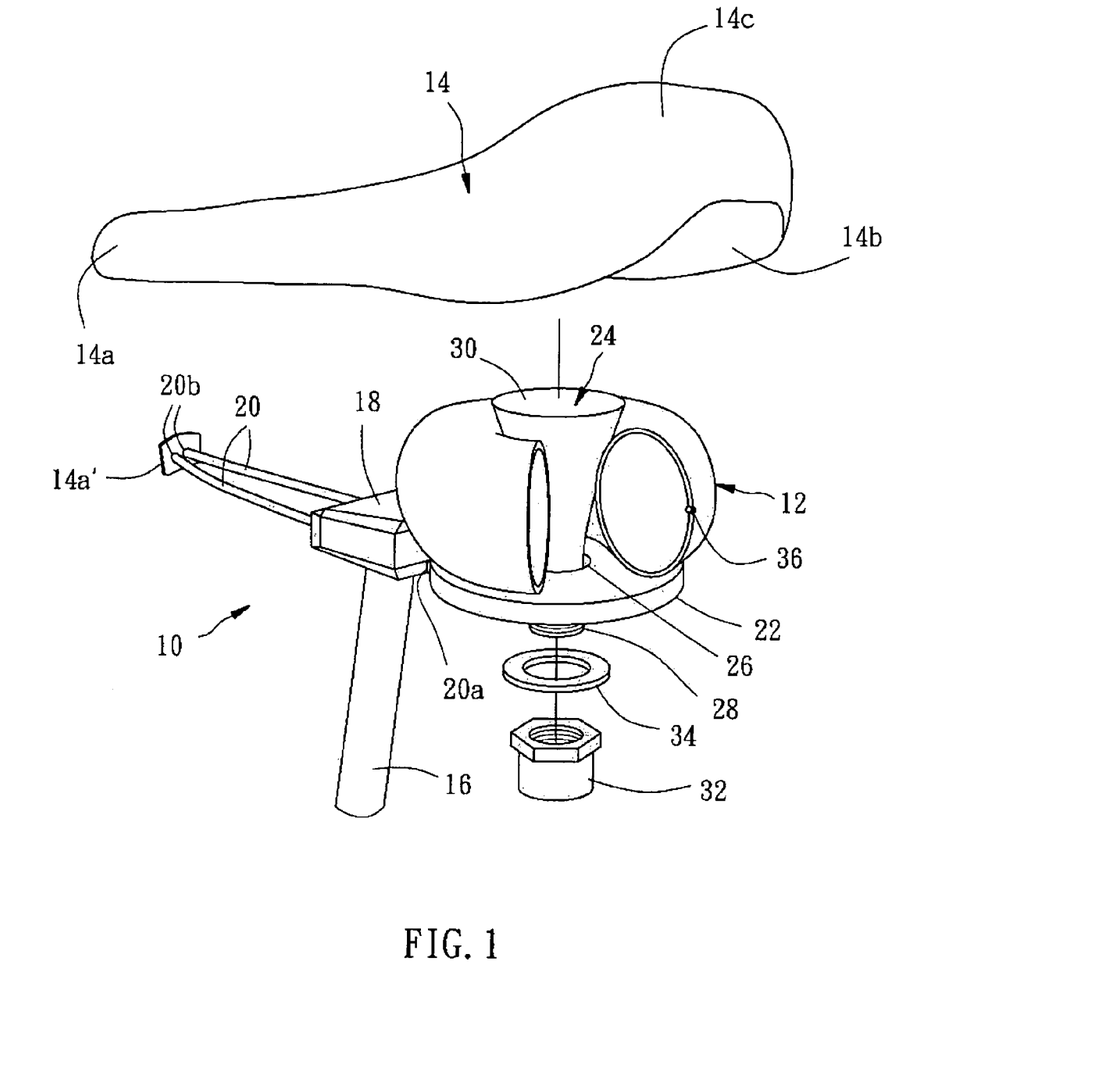
FIG. 1 is an exploded view of a cycle saddle assembly, in accordance with the first aspect of the invention.
Figure 2:
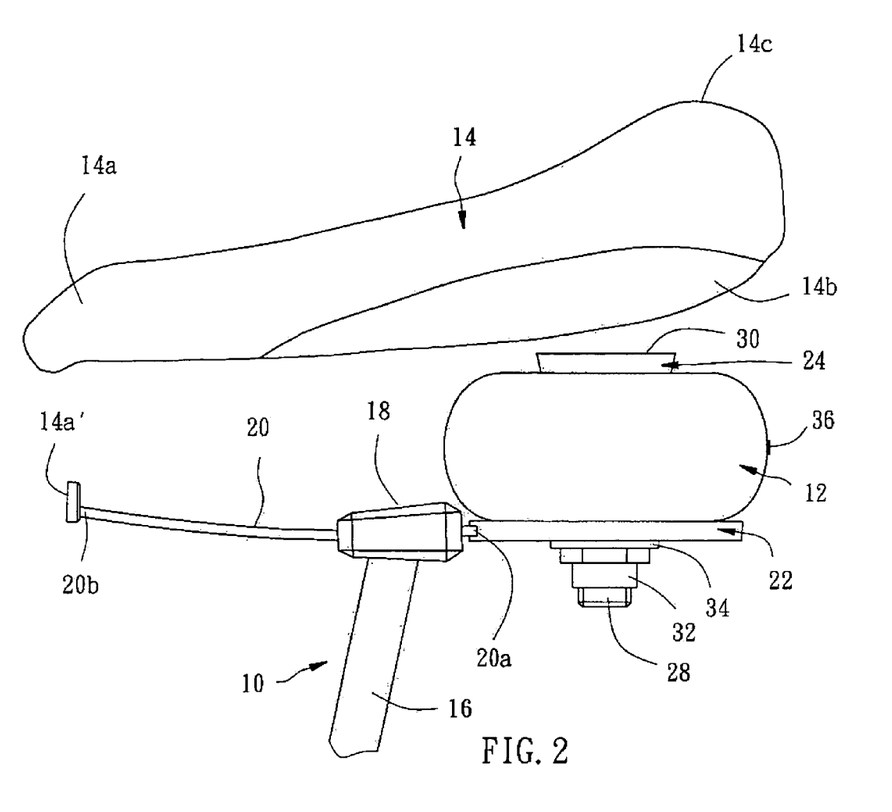
FIG. 2 is a side elevational view of the cycle saddle assembly with the saddle seat separated for clarity.
Figure 3:
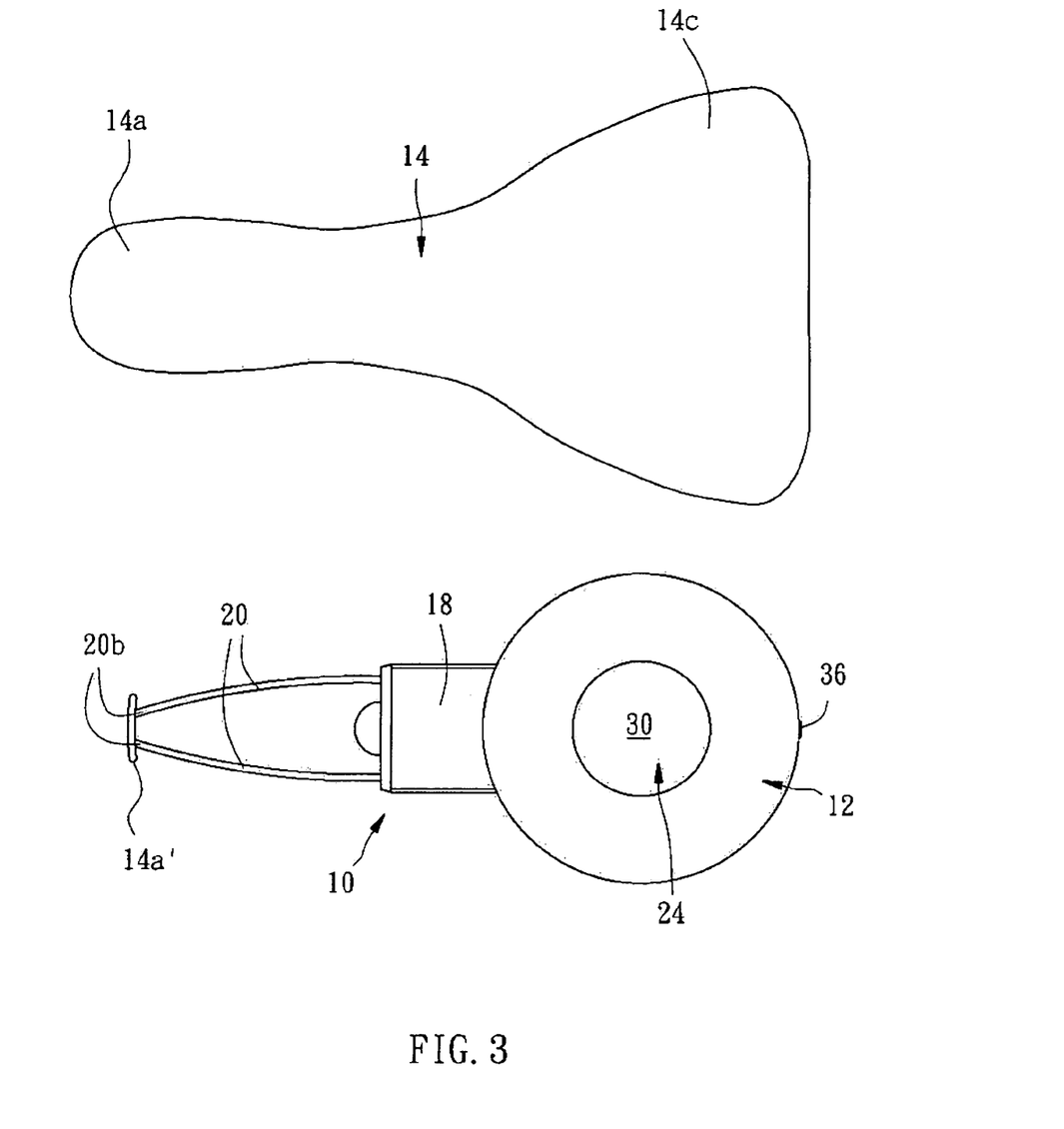
FIG. 3 is a top plan view of the cycle saddle assembly with the saddle seat separated and moved to one side for clarity.

The support plate 22, which is formed from metal or rigid plastics, is generally circular and has a centrally positioned opening 26 through which the locating strut element 24 is slidably received. The locating strut element 24, which is also formed of metal or rigid plastics, has a screw thread formed at one end 28 and tapers outwardly towards the other end 30. The screw thread on the locating strut element 24 is adapted to receive a threaded fastener 32, such as a flanged NylockR™ nut, and an impact absorbing washer 34 is disposed between the threaded fastener 32 and the surface of the support plate 22.

The pneumatic suspension member 12 is formed from rubber and is an air inflatable torus or ring. The suspension member 12 includes inflation adjusting means in the form of a reed valve 36. Dependent on a user and his or her preference, the degree of inflation of the suspension member 12 can thus be adjusted by use of a common reed valve adaptor (not shown) fitted to a suitable pump.

To locate the pneumatic suspension member 12, it is first positioned on the support plate 22 with the locating strut element 24 removed. The locating strut element 24 is then passed through the center of the suspension member 21 and then through the central opening 26 in the support plate 22. The impact washer 34 is slid over the threaded end 28 of the locating strut element 24, and the threaded fastener 32 is then securely engaged with the threaded end 28.

The taper of the locating strut element 24 prevents the suspension member 12 from becoming separated from the support plate 22. The taper, in conjunction with the diameter of the central opening 26 in the support plate 22, also permits a degree of axial movement of the locating strut element 24 relative to the support plate 22 whilst preventing the end 30 of the locating strut element 24 opposite the threaded end 28 form being able to pass through the central opening 26.

The saddle seat 14 is connected at its nose 14a,through a saddle moulded or threadingly fastened clip/hinge assembly 14a', to the second ends 20b of the elongate saddle support elements 20. However, any suitable hingable fastening assembly can be used. The connection permits a degree of pivoting between the saddle seat 14 and the support elements 20.

The saddle seat 14 is connected to the locating strut element 24 through a push-fit releasable fastening (not shown) moulded into the rear of the base 14b of the saddle seat 14. The end 30 of the locating strut element 24 opposite the threaded end 28 is thus simply urged into the push-fit fastening to retain the saddle seat 14 on the stem unit 10.

As with common saddle seats, deformable pads (not shown) are typically provided on the upper surface 14c of the saddle seat 14 to further enhance comport. The pads may be gel, rubber, or any other suitable material.

The suspension assembly described above can be fitted to a typical saddle down-tube of any type of cycle, such as a bicycle, tricycle and unicycle.

The pneumatic suspension member can be of different colours for either aesthetic appeal and/or to indicate a range of material densities. For example, harder compound suspension member material, providing a firmer suspension irrespective of the degree of inflation, may have one colour while softer compound suspension member material, providing a softer suspension, may have another colour.

The pneumatic suspension member can also be formed of any other suitable material. For example, a fluid-tight synthetic flexible material could be utilized.

Although a torus or ring is a simpler manufacturing process, the pneumatic suspension member can have shapes other than a torus. For example, the suspension member could be an inflatable sphere, or any other suitable inflatable shape. FIG. 3 shows the diameter of the suspension member 12 is smaller than the transeverse breadth of the rear side of the saddle seat 14.

The locating strut element can be prevented from separating from the support plate through the use of any other suitable fastening means, instead of the described threaded fastening arrangement. For example, a split pin arrangement could be used.

The locating strut element may, instead of using a push-fit releasable fastening, be threadably fastened to the saddle seat. Any other suitable type of fastening could also be used. Furthermore, the locating strut element could be integrally formed as part of the saddle seat.

The locating strut element need not be tapered, or need not be tapered along its entire length. Preferably, the locating strut element is shaped to prevent the pneumatic suspension member from being easily dislodged from the support plat when in use. However, the shape of the locating element is such that it is prevented from wedging in the opening in the support plate if, for example, the pneumatic suspension member is underinflated.

It is also envisaged that a plurality of stackable pneumatic suspension members could be utilized, locatable on the elongate locating strut element and thereby providing a further degree of user adjustment. In a further modification, a plurality of locating strut elements and pneumatic suspension members could be provided which, in use, are spaced horizontally and transversely relative to the saddle seat. This would enable a greater degree of support for the user.

A secondary pneumatic suspension member could also be provided spaced from the main pneumatic suspension member. For example, provided in a similar manner as the main pneumatic suspension member, the secondary suspension member is positioned at the nose of the saddle seat, interposed between the second ends of the elongate support element and the saddle seat. The saddle seat thus has complete pneumatic suspension.

Two elongate saddle support elements are provided. However, a single support element or more than two support elements could be used.

It is thus possible to provide a neat and compact pneumatic suspension assembly having few mechanical parts and which is cost-effective to produce. It is also possible to provide a pneumatic suspension assembly which is not only effective, but also simple to adjust to suit a user's preference.

The embodiments described above are given by way of example only, and other modifications will be apparent to persons skilled in the art without departing form the scope of the invention as defined by the appended claims.

Figure 4:
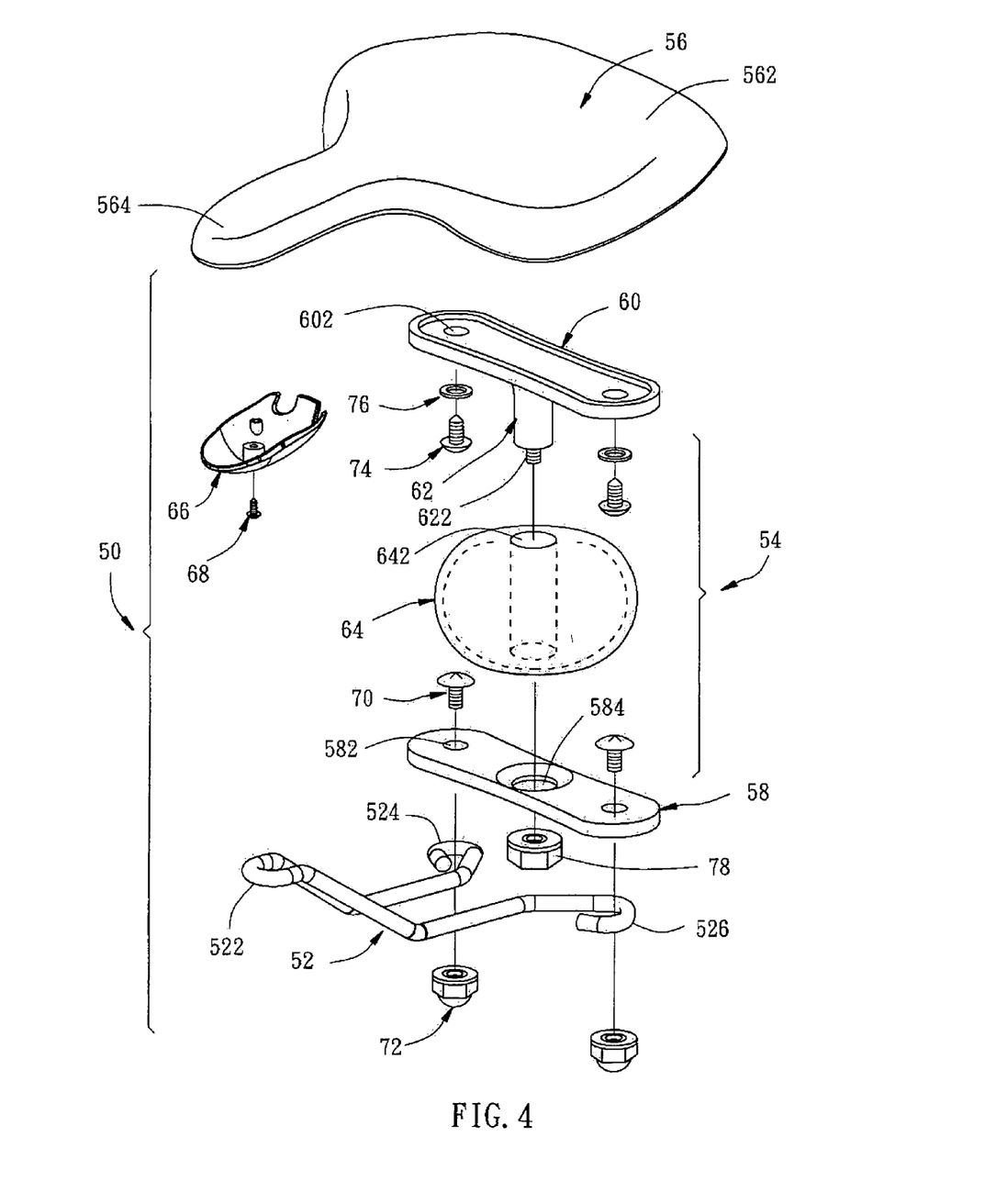
FIG. 4 is an exploded view of a cycle saddle assembly, in accordance with the second aspect of the invention.

With reference further to FIGS. 2-4, there is shown a bicycle saddle assembly 50 constructed in accordance with the second embodiment of present invention. The bicycle saddle assembly 50 includes a support frame 52, a pneumatic suspension means 54 and a saddle body 56.

The support frame 52 may be formed from any suitable material, but preferably a lightweight metal. The support frame 52 has a U-shaped front end 522 and two hook-shaped rear end 524, 526.

The pneumatic suspension means 54 includes a first support plate 58, a second support plate 60, a locating strut member 62 and a pneumatic member 64.

The first and second support plates 58, 60 are formed from metal or rigid plastics. The support plates 58, 60 each has on two side thereof an opening 582, 602. The locating strut member 62 extends downwardly from the center portion of the second support plate 60 with a threaded end 622 thereof. The first support plate 58 has a center hole 584.

The pneumatic member 64 is formed from rubber or any suitable materials and is an air inflatable torus or ring. The pneumatic member 64 may include inflation adjusting means in the form of a reed valve (not shown). Dependent on a user and his or her preference, the degree of inflation of the pneumatic member 64 can thus be adjusted by use of a common reed valve adaptor (not shown) fitted to a suitable pump.

The saddle body 56 may be a conventional bicycle saddle body having a shell made of rigid plastic materials and a pad made of resilient materials disposing on the shell. The saddle body 56 has a wide rear end 562 and a narrow front end 564.

Figure 5:
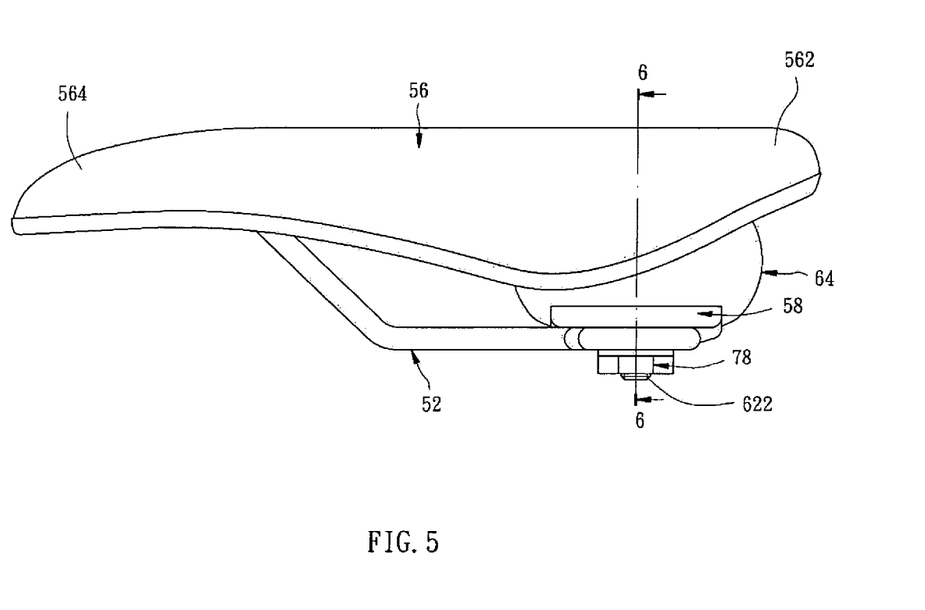
FIG. 5 is a side elevational view of the cycle saddle assembly.
Figure 6:
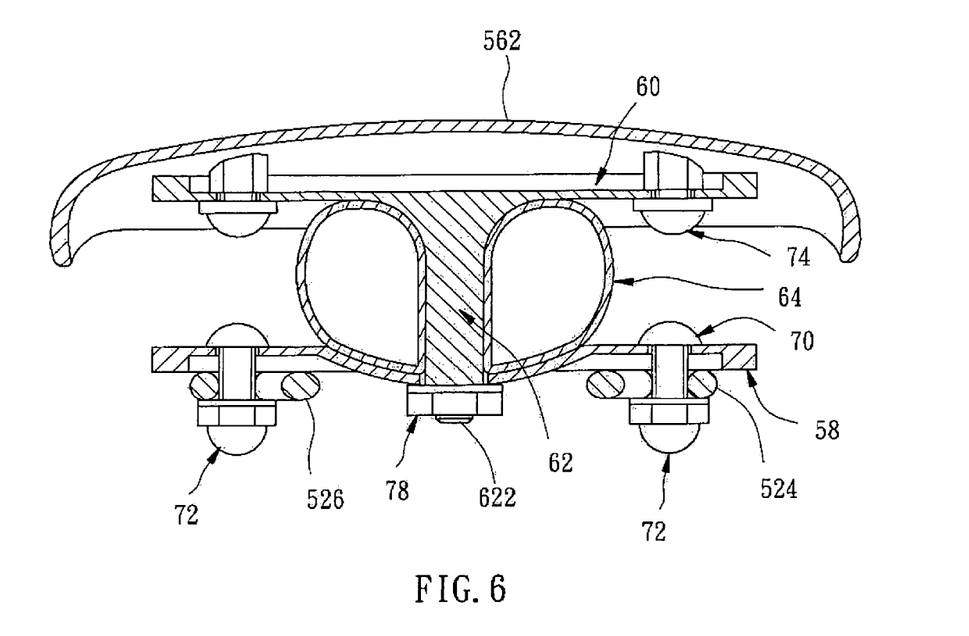
FIG. 6 is a sectional view of the cycle saddle assembly taken along line 6-6 of FIG. 5.

When constructing, the front end 522 of the support frame 52 is connected to the bottom of the front end 564 of the saddle body 56 by a lid 66 and a bolt 68. The first support plate 58 is connected to the support frame 62 by two bolts 70 and two captured nuts 72. Further speaking, each of the bolts 70 respectively passes through each of the holes 582 of the first support plate 58 as well as the hook-shaped rear ends 524, 526 and is captured by the nut 72.

The second support plate 60 is connected on the bottom of the rear end 562 of the saddle body 56 by two bolts 74 respectively passing through each of the openings 602 of the second support plate 60 and two washers 76. The locating strut member 62 passes through the center hole 642 of the pneumatic member 64 as well as the center hole 584 of the second support plate in such a way that the threaded end 622 thereof can pierce through the center hole 584 and is threadedly captured by a nut 78.

According to the construction mentioned above, when being assembled to a bicycle saddle stem, the saddle assembly 50 for having the pneumatic suspension means placed on the center portion of the saddle body can absorb the shock omnidirectionally produced from the rider and the frame of the bicycle during riding.

In addition, in accordance with the aspect of the present invention, not only a pneumatic suspension means can be provided on the saddle assembly. For example, there can be a second pneumatic suspension means arranged between the front end 522 of the support frame 52 and the bottom of the front end 564 of the saddle body 56. Certainly, the saddle assembly constructed according to the present invention do not need the locating strut member and only has the pneumatic member 64 placed in between the first and second support plates 58, 60.

Figure 7:
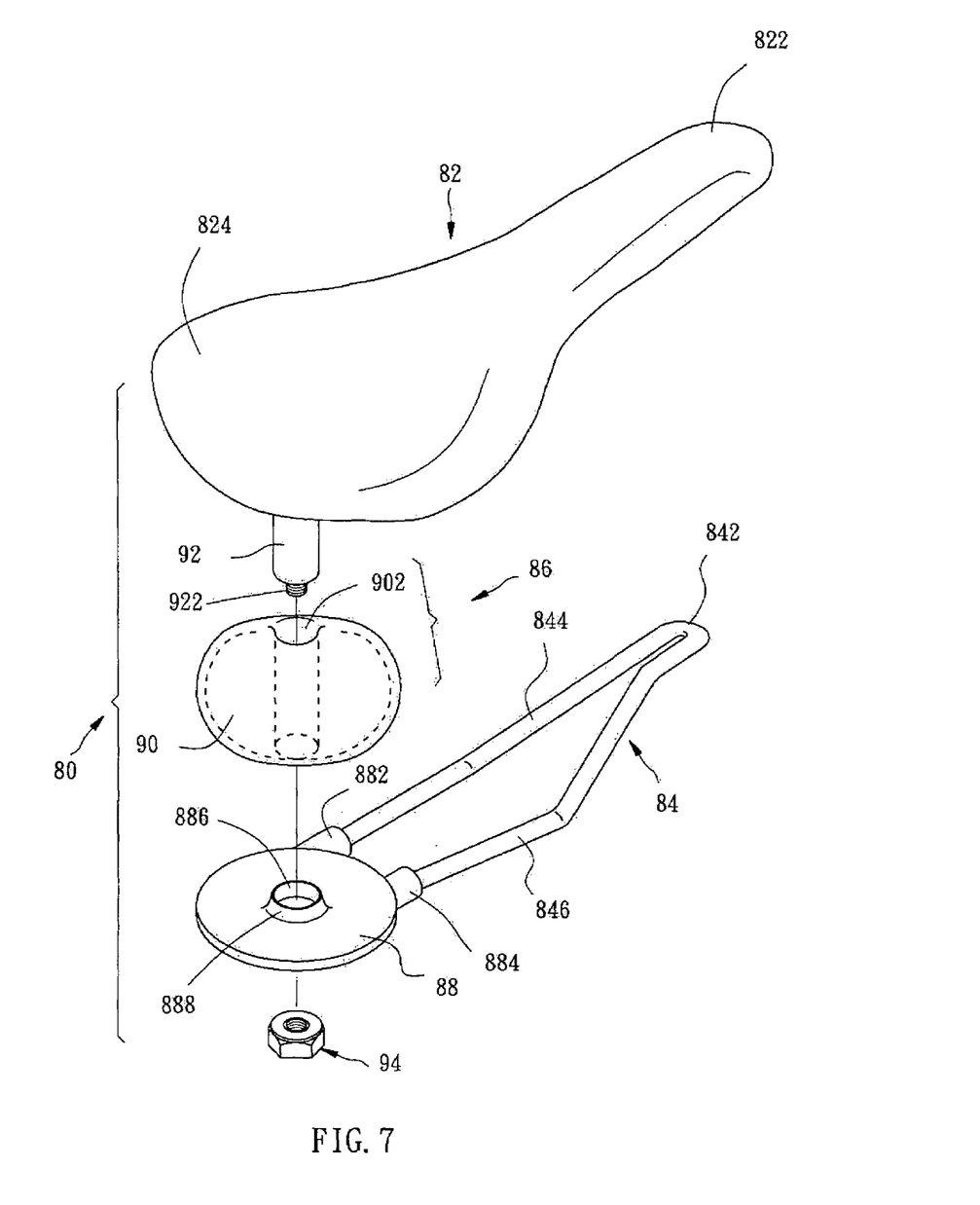
FIG. 7 is an exploded view of a cycle saddle assembly, in accordance with the third aspect of the invention.
Figure 8:
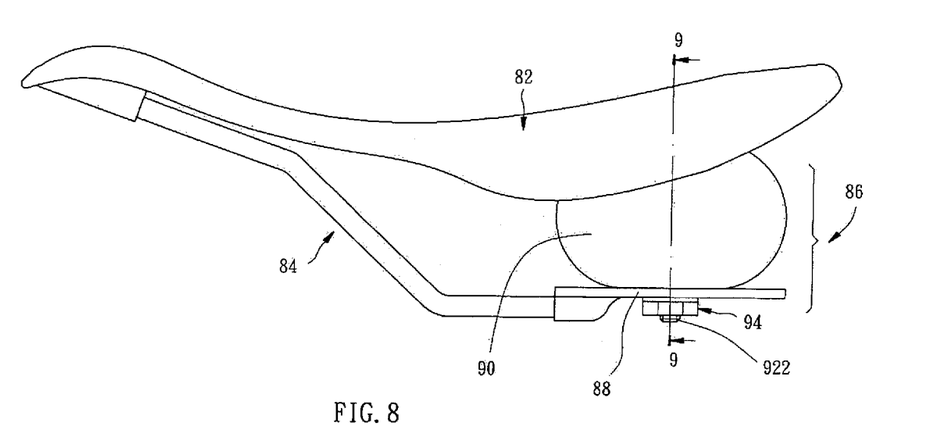
FIG. 8 is a side elevational view of the cycle saddle assembly.
Figure 9:
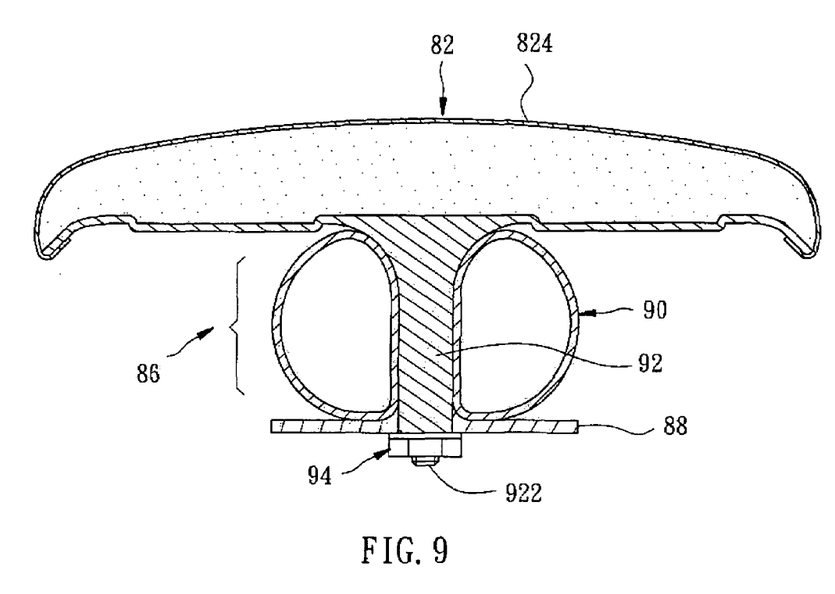
FIG. 9 is a sectional view of the cycle saddle assembly taken along line 9-9 of FIG. 7.

Referring lastly to FIGS. 7-9, there is shown a bicycle saddle assembly 80 constructed in accordance with the third embodiment of present invention. The bicycle saddle assembly 80 includes a saddle body 82, a support frame 84 and a pneumatic suspension means 86.

The saddle body 82 is a conventional bicycle saddle body having a shell made of rigid plastic materials and a pad made of resilient materials disposing on the shell. The saddle body 56 has a narrow end 822 and a wide end 824.

The support frame 84 may be made of any suitable material, but preferably a lightweight metal. The support frame 84 has a U-shaped end 842 with two arms 844,846 extending therefrom.

The pneumatic suspension means 86 has a support plate 88, a pneumatic member 90 and a locating strut member 92. The support plate 88 is molded from metal or rigid plastics, which can be any shape, in this embodiment, is a circular plate. The support plate 88 has two sleeves 883, 884 distancedly disposed on the side edge thereof and a center opening 886 with a protruding edge 888. Each of the arms 844, 846 of the support frame 84 is respectively inserted into each of the sleeves 882,884 to connect the support frame 84 and the support plate 88.

The pneumatic member 90 is the same as that of the second embodiment, which is an air inflatable torus or ring with a center hole 902. The locating strut member 92 extends downwardly from the bottom of the center portion of the wide end 824 of the saddle body 82 and has a threaded open end 922. In this embodiment, the locating strut member 92 and the shell of the saddle body 82 are integrally formed from rigid plastics.

When constructing, the pneumatic member 90 is placed on the upper side of the support plate 88. The locating strut member 92 then passes through the center hole 902 of the pneumatic member 90. And then the open end 922 of the locating strut member 92 is captured by a nut 94. Whereby, as the support frame 84 is attached to a bicycle saddle stem, the saddle body 82 is slidable relative to the support plate 88.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cycle saddle assembly consisting of:
 a stem unit having a saddle stem;
 a single pneumatic suspension member supported by the stem unit; and
 a saddle seat supported at least in part by the pneumatic suspension member for movement relative to the saddle stem,
 wherein the stem unit includes a single support plate which carries the single pneumatic suspension member, and
 wherein the stem unit further includes a locating strut element located at a midsection of a rear side of said saddle seat and coupled with the support plate and the saddle seat, said strut element slidably downwardly extending through a center hole of said pneumatic suspension member, a diameter of said locating strut element at a lower end of said center hole of said pneumatic suspension member being smaller than said center hole while said diameter of said locating strut element at an upper end of said center hole being larger than a diameter of said center hole, said locating strut element being slidable relative to the support plate, the pneumatic suspension member being located on the strut element, and having a diameter which is smaller than the transverse breadth of the rear side of said saddle seat, and a means for fastening the locating strut.

2. A cycle saddle assembly consisting of:
 a stem unit having a saddle stem;
 a single pneumatic suspension member supported by the stem unit, said pneumatic suspension member is an inflatable ring of toroidal shape and includes an inflation adjustment valve; and
 a saddle seat supported at least in part by the pneumatic suspension member for movement relative to the saddle stem,
 the stem unit including a single support plate which carries the single pneumatic suspension member, and
 one or more elongate support elements having one end which is connected to the support plate and another end which is connected to the saddle seat, the saddle seat being pivotable relative to the elongate support elements;
 wherein the stem unit further includes a locating strut element located at a midsection of a rear side of said saddle seat and coupled with the support plate and the saddle seat, said strut element slidably downwardly extending through a center hole of said pneumatic suspension member, a diameter of said locating strut element at a lower end of said center hole of said pneumatic suspension member being smaller than said center hole while said diameter of said locating strut element at an upper end of said center hole being larger than a diameter of said center hole, said locating strut element being slidable relative to the support plate, the pneumatic suspension member being located on the strut element, and having a diameter which is smaller than the transverse breadth of the rear side of said saddle seat, and a means for fastening the locating strut.

3. A cycle saddle assembly consisting of:

a stem unit having a saddle stem;

a single pneumatic suspension member supported by the stem unit; and a saddle seat supported at least in part by the pneumatic suspension member for movement relative to the saddle stem, wherein the stem unit includes a single support plate which carries the single pneumatic suspension member, and wherein the stem unit further includes a locating strut element located at a midsection of a rear side of said saddle seat and coupled with the support plate and the saddle seat, said strut element slidably downwardly extending through a center hole of said pneumatic suspension member, a diameter of said locating strut element at a lower end of said center hole of said pneumatic suspension member being smaller than said center hole while said diameter of said locating strut element at an upper end of said center hole being larger than a diameter of said center hole said locating strut element being slidable relative to the support plate, the pneumatic suspension member being located on the strut element, and having a diameter which is smaller than the transverse breadth of the rear side said of said saddle seat;

wherein the locating strut element includes a thread at a lower end thereof for receiving a nut, said lower end extending through a hole of said support plate and said nut having a diameter larger than a diameter of said hole of said support plate to prevent said locating strut element from being removed from said support plate.

* * * * *